United States Patent
Hosier et al.

(10) Patent No.: US 7,518,759 B2
(45) Date of Patent: *Apr. 14, 2009

(54) READOUT SYSTEM FOR A CMOS-BASED IMAGE SENSOR ARRAY

(75) Inventors: Paul A. Hosier, Rochester, NY (US);
Scott L. TeWinkle, Ontario, NY (US);
Jagdish C. Tandon, Fairport, NY (US);
Pravin N. Kothari, Poughkeepsie, NY (US)

(73) Assignee: Xerox Corporation, Norwalk, CT (US)

( * ) Notice: Subject to any disclaimer, the term of this patent is extended or adjusted under 35 U.S.C. 154(b) by 1088 days.

This patent is subject to a terminal disclaimer.

(21) Appl. No.: 10/421,010

(22) Filed: Apr. 22, 2003

(65) Prior Publication Data

US 2004/0212850 A1 Oct. 28, 2004

(51) Int. Cl.
*H04N 1/04* (2006.01)
(52) U.S. Cl. .................. 358/474; 358/483; 358/482; 348/311; 348/280
(58) Field of Classification Search .................. 358/483, 358/408, 530, 474, 501, 514; 348/311, 280, 348/303, 302, 308, 307; 250/208.1
See application file for complete search history.

(56) References Cited

U.S. PATENT DOCUMENTS

| | | | | |
|---|---|---|---|---|
| 4,087,833 A | * | 5/1978 | Tseng | 257/230 |
| 4,737,854 A | * | 4/1988 | Tandon et al. | 358/482 |
| 4,896,216 A | * | 1/1990 | Brunst et al. | 358/482 |
| 5,105,277 A | * | 4/1992 | Hayes et al. | 348/313 |
| 5,506,533 A | * | 4/1996 | Wu | 327/227 |
| 5,543,838 A | * | 8/1996 | Hosier et al. | 348/311 |
| 6,545,712 B1 | * | 4/2003 | Hosier et al. | 348/308 |
| 6,954,230 B2 | * | 10/2005 | Monoi | 348/303 |

FOREIGN PATENT DOCUMENTS

| | | |
|---|---|---|
| EP | 0 260 956 A2 | 3/1988 |
| EP | 0 908 957 A2 | 4/1999 |
| EP | 0 921 676 A2 | 6/1999 |

* cited by examiner

*Primary Examiner*—Negussie Worku
(74) *Attorney, Agent, or Firm*—R. Hutter

(57) ABSTRACT

In an image sensor having a plurality of photodiodes, subsets of photodiodes share a common node for signals to be sent to an amplifier. Within each subset, each individual photodiode is selected for sending signals to the amplifier by an associated selection device. The selection device is a MOS device operating in a linear region. The subset of photodiodes share a common "fill and spill" or "bucket brigade" transfer circuit to the amplifier, the transfer circuit including at least one MOS device which operates in a subthreshold region.

7 Claims, 5 Drawing Sheets

READOUT SYSTEM FOR A CMOS-BASED IMAGE SENSOR ARRAY

CROSS-REFERENCE TO RELATED APPLICATION

Cross-reference is hereby made to U.S. patent application Ser. No. 10/420,989, Publication No. 20040212858, published Oct. 28, 2004, titled PHOTOSENSOR ARCHITECTURE FOR A COLOR RASTER INPUT SCANNER, assigned to the assignee hereof, and being filed simultaneously herewith.

TECHNICAL FIELD

The present disclosure relates to CMOS-based image sensor arrays used in raster input scanners, such as in digital copiers and other office equipment.

BACKGROUND

CMOS-based image sensor arrays typically comprise a linear array of photosites which raster scan an image bearing document and convert the microscopic image areas viewed by each photosite to image signal charges. Following an integration period, the image signal charges are amplified and transferred to a common output line or bus through successively actuated multiplexing transistors. In the scanning process, bias and reset charges are applied in a predetermined time sequence during each scan cycle. Where the array employs two stage transfer circuits for transferring the image signal charges from the photosites, the bias charge is applied to each photosite through a charge injection transistor and the first transistor in the two stage transfer circuit. The reset charge is applied through a reset charge injection transistor and the second transistor of the two stage transfer circuit.

DESCRIPTION OF THE PRIOR ART

U.S. Pat. No. 4,896,216 discloses a linear sensor array having m groups of n sensor elements on an integrated circuit. Each of the groups are read out simultaneously, one sensor at a time. While the image-related charge on each photosensor is waiting to be read out, the charge on the photosensor is stored on a capacitor associated with, and parallel to, the photodiode of the photosensor. At read out, the charge is read directly from the capacitor to a shared amplifier, by the action of a transistor switch operated by a shift register.

U.S. Pat. No. 5,105,277 discloses a sensor array in which performance variations among different photosites in the array are canceled out by the injection of a "fat zero" bias via the middle node between first and second stage transfer transistors for transferring the image signal charge from the photodiode to an amplifier. This fat zero voltage sets a fixed and known bias charge on the photodiode. The two-stage process allows the charge on the photodiode to be transferred to the amplifier through the same transistors used to place the biased charge on the photosite originally, and as a result, transistor threshold variations across the array are canceled. The main purpose of the fat zero bias voltage being initially put on the photodiode node is to ensure transfer efficiency of collected charge on the photodiode, and thereby give a linear response to all levels of light detected by the photodiode.

U.S. Pat. No. 5,543,838 discloses a signal multiplexing system for an image sensor array, wherein a triplet of three sensors, each sensor being made sensitive to one primary color, is connected to a single transfer circuit and amplifier. Signals to nodes in the transfer circuit enable readout of the primary color signals through the amplifier.

SUMMARY OF THE INVENTION

According to one aspect of the present invention, there is provided a photosensitive apparatus, comprising a first photosensor; a first switching device for accepting a signal from the first photosensor, the first switching device including a MOS device operating in a linear region; and a transfer device, downstream of the first switching device, the transfer device including at least one MOS device operating in a subthreshold region.

DETAILED DESCRIPTION

In the following description and accompanying Figures, the following convention will be followed: a circuit element as shown in the Figures will have a reference index such as PDX; in the timing diagrams, a pulse to the circuit element will be called $\phi_{PDX}$, a voltage (or an external source supplying such a voltage) associated with an element such as FZ will be $V_{FZ}$, etc. Capacitances, whether intended or parasitic, associated with a node or device such as PD are indicated for example as $C_{PD}$. Not all of the elements shown in the Figures will be described in the text, but a comparison of the schematic of FIG. 1 with the timing diagram of FIG. 2 serves as an enabling disclosure for an embodiment.

Figure 1:
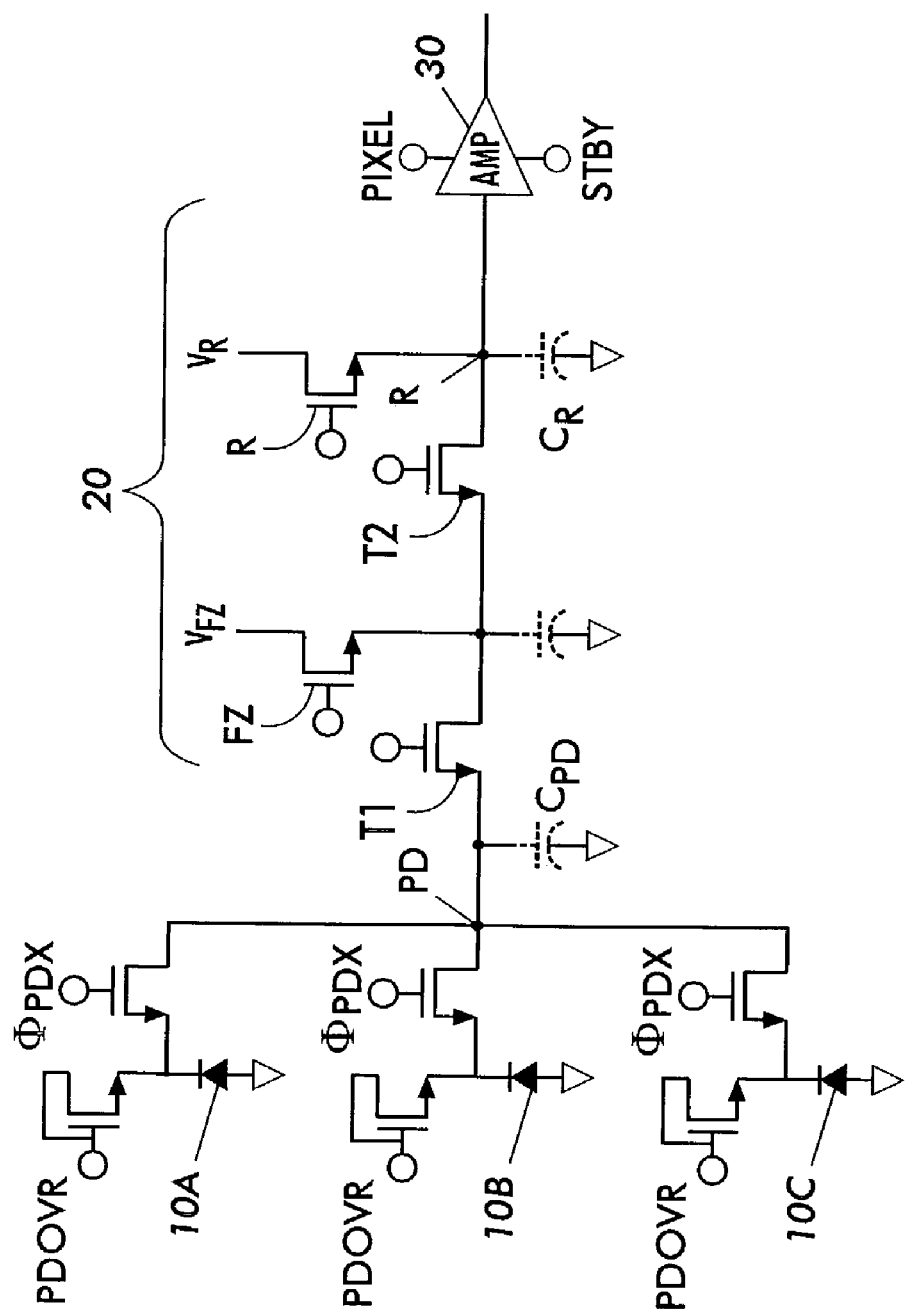
FIG. 1 is a schematic diagram of a set of photosensors, in the form of photodiodes, and associated circuitry.

FIG. 1 is a schematic diagram of a set of photosensors, in the form of photodiodes, and associated circuitry. Each photodiode 10A-10C is formed, in a well-known context, in the main surface of a silicon chip, and typically hundreds or thousands of such photodiodes are present, in one or more linear arrays, in a photosensor chip such as would be found in the input scanner for recording hard-copy images in office equipment such as a digital copier or facsimile, the signals generated at the various photosensors over time being transferred into a relatively small number of video output lines for serial output from the chip. In a familiar arrangement, three photodiodes 10A-10C are each shielded by a primary-color translucent filter (not shown) so that the outputs of the three photodiodes can be combined to yield a full-color (such as RGB) signal relating to a small area on an original image being scanned. Each photosensor is provided with an overflow device PDOVR which prevents "blooming" in a practical embodiment.

As shown in FIG. 1, one or more photodiodes such as 10A-10C is associated with a transfer circuit generally indicated as 20. The photodiodes 10A-10C share a common node PD, which has a parasitic capacitance $C_{PD}$. The transfer circuit 20 is here shown in the form of a two-stage (or two-device) transfer circuit with the capability of fat-zero injection. Such a transfer circuit and its operation is described in detail in the '277 patent referenced above. There are two MOS devices, indicated by T1 and T2, in series downstream from one or more photodiodes 10. Between devices T1 and T2 is a "fat zero" node FZ, upon which a fat zero charge can be supplied via external source $V_{FZ}$; downstream of T2, before amplifier 30 which reads out voltage signals to a video out line, is a reset node which accepts a reset signal $V_R$. The basic purpose of the fat zero injection is to "prime the pump" of charge transfer through transfer circuit 20, so that the photodiode 10 outputs signal charges in its linear range of response relative to light impinging thereon. Together, T1 and T2 operate in a "fill and spill" or "bucket brigade" fashion, transferring out a carefully-maintained charge through two steps, so that the resulting voltage output from amplifier 30 is an accurate signal related to the light impinging of a photosensor 10A-10C during a defined integration period.

In this embodiment, the devices such as T1 or T2 operate in a subthreshold region for diffusion current operation to enable the "bucket brigade" or "fill and spill" transfer as described in the '277 patent.

Associated with each photodiode 10 in this embodiment is what is here called a switch device PDA, PDB, PDC, or generically PDX. As illustrated, if a plurality of photodiodes 10A-10C are associated with a single transfer circuit 20, each photodiode 10 is associated with a single switch device. The switch device PDX in this embodiment is a MOS device, but, in contrast to devices T1 or T2 described above, operates in a linear region for drift current operation, in effect operating merely as a digital switch so that the level of voltage on photodiode 10 is not determined or limited by the device PDX. Since the PDX device is not a "bucket-brigade" transfer device, for which the drain conductance and gate length is important, the PDX device can made very small, which is advantageous from the standpoints of space, thermal noise, and parasitic capacitance.

Figure 5:
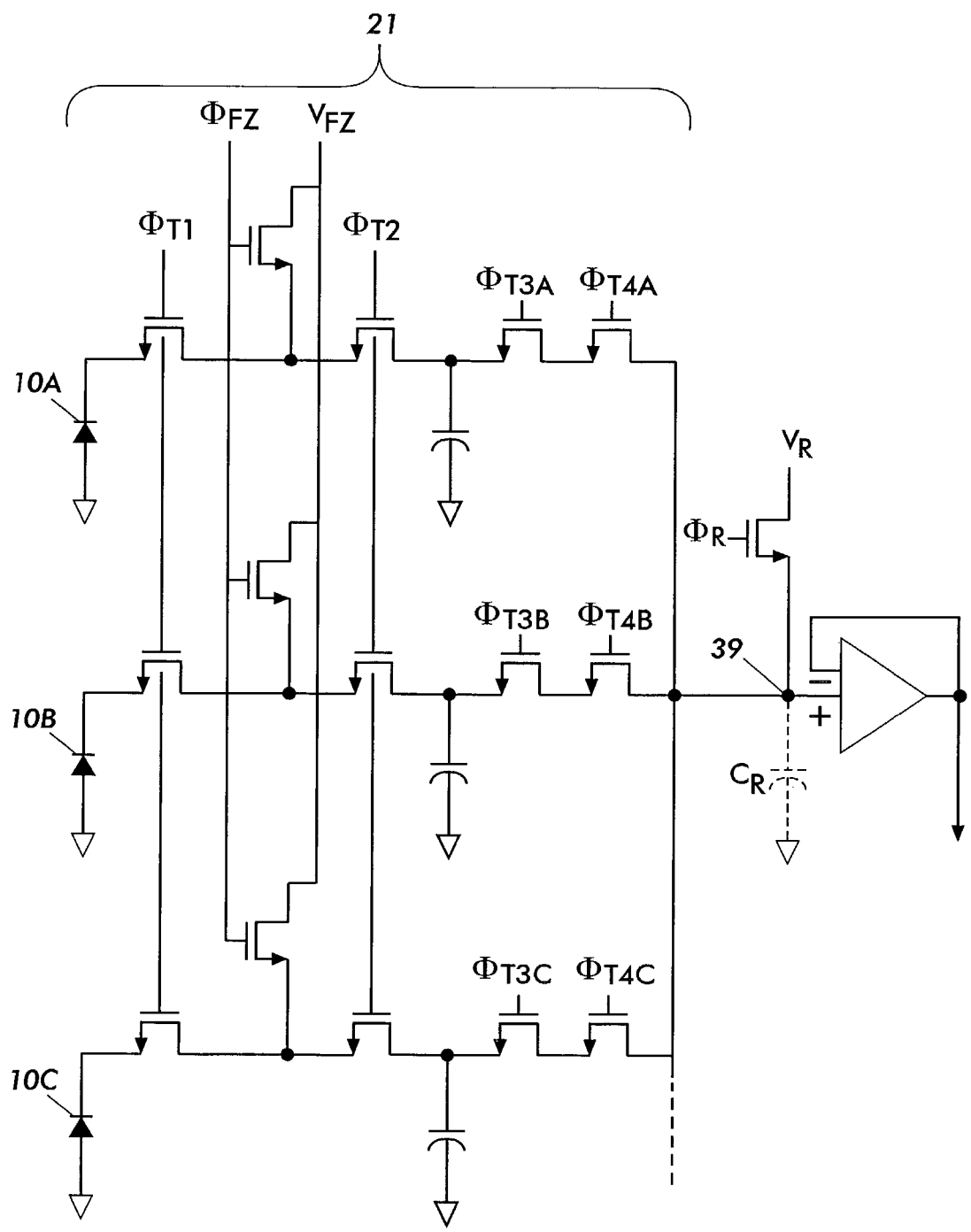
FIG. 5 is a schematic diagram of a set of photosensors, in the form of photodiodes and associated circuitry, according to a prior-art arrangement.

For contrast, FIG. 5 is a schematic diagram of a set of photodiodes 10A-10C as would exist, for example, in a set of primary-color filtered photodiodes in a full-color photosensor array such as shown in the '838 patent referenced above, which are connected to a common transfer circuit here indicated as 21, in a prior-art configuration where a "fill and spill" device comprising forming part of the transfer circuit 21 itself is used as a selector. As can be seen, the "fill and spill" devices T1 and T2 as shown in FIG. 1 must be supplied for each photodiode 10A-10C, even if, as shown, the photodiodes share a common amplifier. Further, each photodiode must have associated therewith a second pair of devices, T3A, T4A, T3B, T4B, T3C, T4C, which must be individually controlled to pass signals to the amplifier. Also, as will be described in detail below, with the FIG. 5 apparatus, careful attention must be paid to parasitic capacitances between each photodiode and its associated devices.

Figure 2:
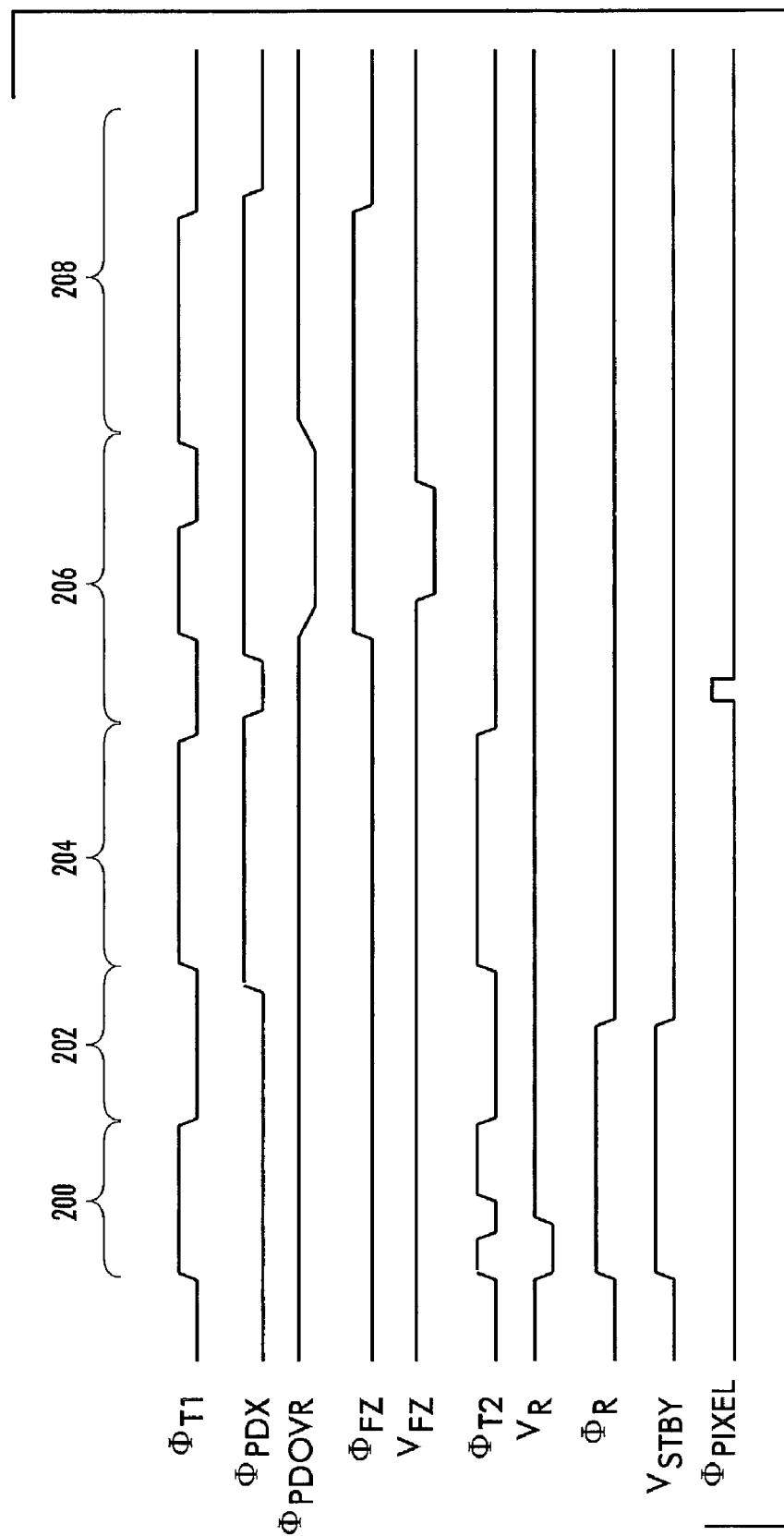
FIG. 2 is a comparative timing diagram of signals to various elements in FIG. 1, showing a method of operating according to one embodiment.

FIG. 2 is a timing diagram showing the operations associated with the circuitry of FIG. 1, according to one embodiment. The timing in the diagram repeats for each of a number of photodiodes 10A-10C sharing a common transfer circuit 20, with a different $\phi_{PDX}$ being pulsed in the repeated timing. As shown in the Figure, different signals applied to various devices cause the different stages of exposure and readout to be carried out. At step 200 as shown, the middle node between devices T1 and T2 is filled and spilled; at step 202, the reset node R is cleared to prepare for a signal readout. Step 204 represents the end of integration period of the photodiode, in which light impinging of the photodiode is converted into a measurable charge signal. Step 206 represents the application of the predetermined "fat zero" charge, which once again serves to "prime the pump" of the transfer circuit 20 so that the system exhibits a largely linear response. At step 208 the fat zero charge is spilled from the node FZ, and the integration period of the photodiode begins. The PIXEL and STBY signals are for operation of the amplifier 30 in a familiar manner to read out the charge signal from transfer circuit 20 as an output voltage signal.

In the embodiment of FIG. 2, there is only one $\phi_{T1}$ analog clock; in addition, there are n $\phi_{PDX}$ digital clocks (VDD high level, or analog if desired with the pulse being less than VDD but greater than $\phi_{T1}$). The high periods of the $\phi_{PDX}$ clocks should overlap the $\phi_{T1}$ clock during transfer and "fill and spill" to T2 as shown in FIG. 2. This overlap ensures that the "bucket brigade" transfer between the T1 and T2 devices within transfer circuit 20 is not affected by switching noise. Also, the $\phi_{T1}$ clock must be pulsed one additional time, during the "fill and spill" of the middle node as shown in FIG. 2, to make sure the $C_{PD}$ node is reset from the previous photodiode readout, when maximum integration times are not used for all rows. Further, in the embodiment, the device PDX acts as a pass device or switch device when the bias applied to the gate thereof in operation, $\phi_{PDX}$, is higher than the bias of the pulse $\phi_{T1}$ applied to the gate of T1.

In an alternate embodiment, the switching device operates in "bucket brigade" spill mode and therefore the $\phi_{PDX}$ clocks have an analog pulse level that is lower than the pulse level of $\phi_{T1}$. In such a design, all of the $\phi_{T1}$ pulses are the same level as in the FIG. 2 embodiment, but the levels of the $\phi_{PDX}$ pulses are selected for enabling the $V_{FZ}$ injection. The $\phi_{PDX}$ clocks do not have to overlap the $\phi_{T1}$ clock in this case since there is no concern of a large switching charge. However, if the switching device PDX operates in "bucket brigade" spill mode, the PDX device should be made larger, comparable to the size of T1 devices, to minimize the threshold flicker noise effect on charge from the photodiode. This embodiment will have the advantages of the FIG. 2 embodiment, with about the same noise. The disadvantage is a loss of some signal range due to the requirement on the lower level of the $\phi_{PDX}$ clock in what is, in effect, a three-stage "bucket brigade" scheme.

Figure 3:
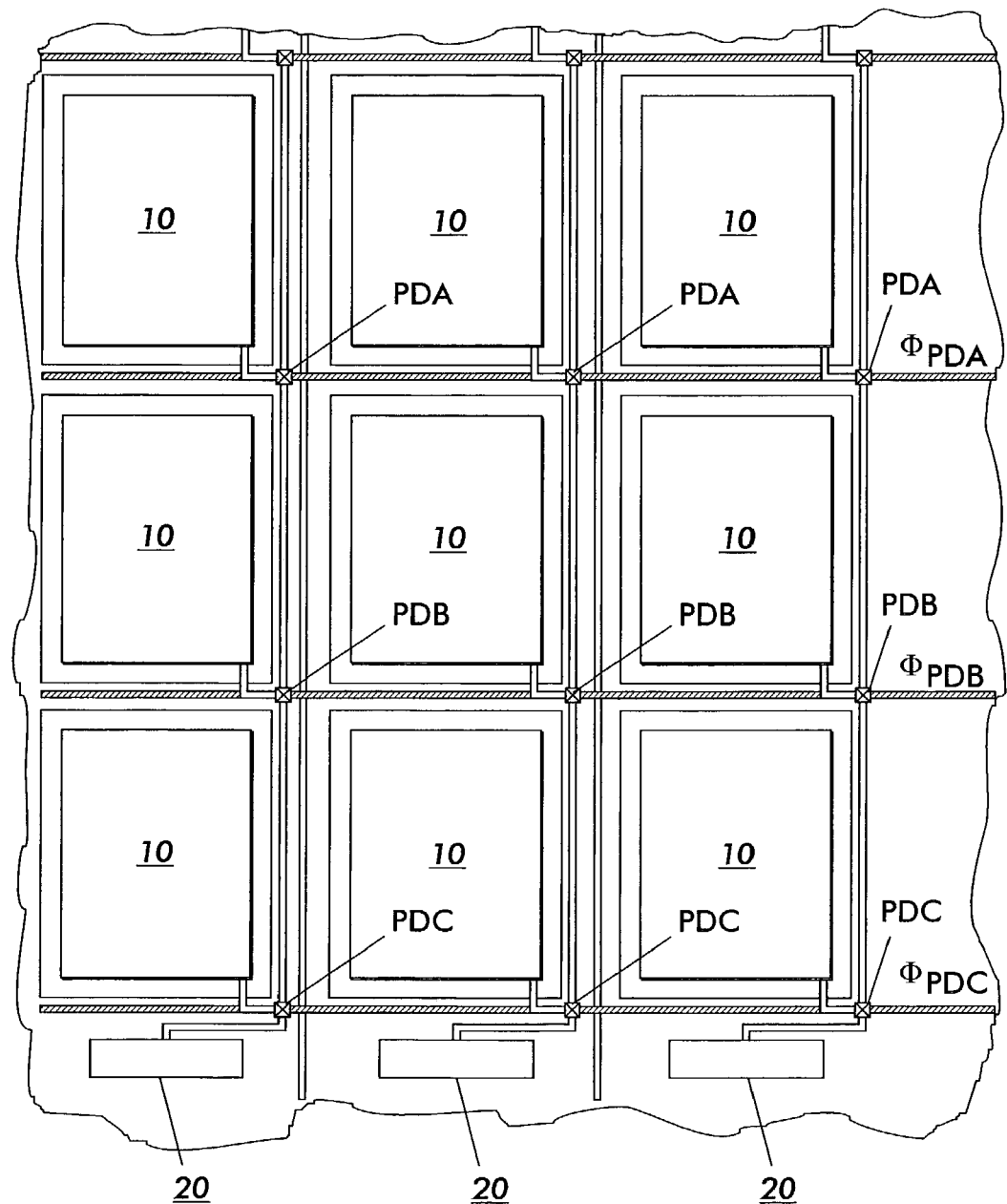
FIG. 3 is a plan view of several sets of photosensors, such as in FIG. 1, as would be embodied in a main surface of a photosensor chip.

FIG. 3 is a plan view of a set of photodiodes 10 as would exist, for example, in a set of primary-color filtered photodiodes 10 in a full-color photosensor array, which are connected to a common transfer circuit 20. As shown in FIG. 3, it is desirable to have the PDX switching devices positioned as close to the photodiodes as possible to minimize the parasitic capacitance $C_{PDX}$ (which is not shown in the Figure, but is in parallel with, or next to, the photodiodes), and at the same time add as little additional capacitance to $C_{PD}$ by careful placement. By minimizing both $C_{PDX}$ and $C_{PD}$, the total random thermal noise will be minimized.

Figure 4:
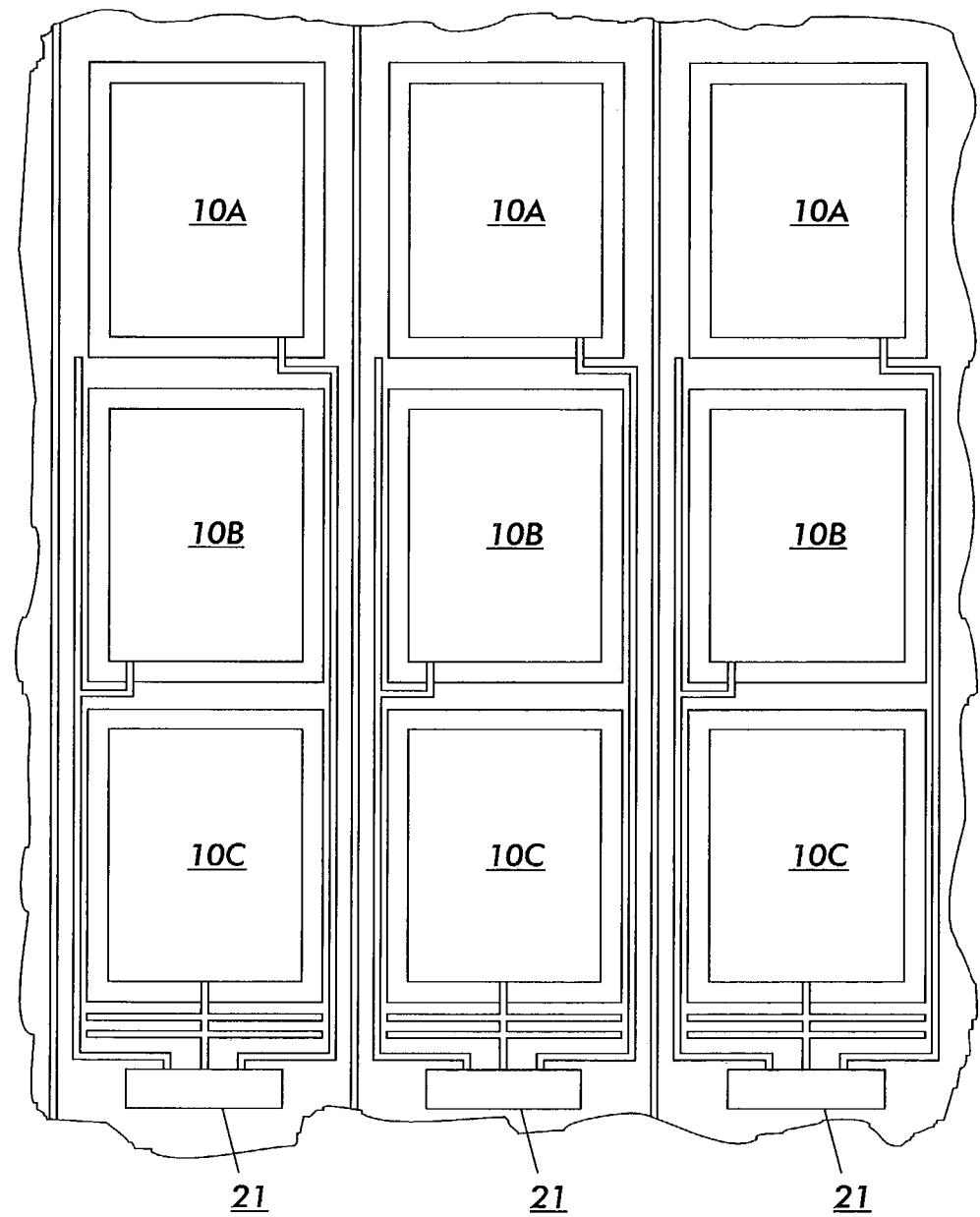
FIG. 4 is a plan view of several sets of photosensors, as would be embodied in a main surface of a photosensor chip according to a prior-art arrangement.

In FIG. 4, which corresponds to the prior-art arrangement in the schematic of FIG. 5, the lines or conductive traces connecting each photodiode 10 to the common transfer circuit 20 must be designed to have roughly comparable surface areas, to yield comparable parasitic capacitances, so that the "fill and spill" properties are consistent with each photodiode. It can thus be seen that the FIG. 1-3 embodiment, because it does not require equalized capacitances in the lines between the photodiodes and the transfer circuit and enables the use of relatively small devices as switching devices, take up significantly less space on a chip in comparison to the prior art. Therefore, the pixel opening, or photosensitive area, can be made larger for the same size pitch sensor. This means the signal to noise ratio will be higher and there will be less undesirable Moiré.

It should be noted that the PDX devices and clocking scheme of the embodiments is not simply the same as matrix addressing. The devices do not just connect digital address lines to selection devices, or the devices do not just connect a photodiode to a current sensing circuit. The scheme allows the direct passage of photo-generated charge, with high efficiency, to a storage node, without any lag effects. In other prior art matrix addressing schemes, the switches also operate in the linear region and therefore there is no fat zero put on the photodiodes. Therefore, the charge transfer in not as efficient and there are scanline to scanline lag effects. The combination of the two-stage "bucket brigade" transfer and the selection switch does not have these disadvantages. In addition, the size, position and clocking of the selection switches are carefully selected as previously described to minimize noise and maximize responsivity of the sensor. In addition, the disclosed embodiment uses a switching level that is not a normal digital CMOS level (VDD and GND), but a level that is less than VDD and determined by the $\phi_{T1}$ level. In the second embodiment the "switching" transistors are not operating in the linear region, but are operating in bucket brigade mode.

The invention claimed is:

1. A photosensitive apparatus, comprising:
   a first photosensor;
   a first switching device, for accepting a signal from the first photosensor, the first switching device including a MOS device operating in a linear region for drift current operation, the first switching device operating as a digital switch so that voltage on the first photosensor is not limited by the first switching device;
   a transfer device, downstream of the first switching device, the transfer device including at least one MOS device operating in a subthreshold region, the transfer device further including means for applying a fat zero to a signal.

2. The apparatus of claim 1, further comprising
   a second photosensor;
   a second switching device, for accepting a signal from the second photosensor; and
   a common node shared by the first switching device and the second switching device, upstream of the transfer device.

3. The apparatus of claim 2, the first photosensor being adapted for receiving light of a first range of wavelength, the second photosensor being adapted for receiving light of a second range of wavelength.

4. The apparatus of claim 1, further comprising
   an amplifier downstream of the transfer device.

5. The apparatus of claim 4, further comprising
   a video output line downstream of the amplifier.

6. The apparatus of claim 1, further comprising
   means for applying a timing pulse to a gate of the switching device and to a gate of the transfer device, wherein the pulse to the gate of the switching device has a higher level than the pulse to the transfer device.

7. The apparatus of claim 6, wherein, in operation during a transfer of a signal from the switching device to the transfer device, the pulse to the gate of the switching device overlaps in time the pulse to the transfer device.

* * * * *